E. DANFORD.
CAR-AXLES.

No. 195,491. Patented Sept. 25, 1877.

Attest., W. C. Corlies L. A. Bunting

Inventor, Ebenezer Danford. By Coburn & Thacher Attys

UNITED STATES PATENT OFFICE.

EBENEZER DANFORD, OF GENEVA, ILLINOIS.

IMPROVEMENT IN CAR-AXLES.

Specification forming part of Letters Patent No. 195,491, dated September 25, 1877; application filed June 4, 1877.

*To all whom it may concern:*

Be it known that I, EBENEZER DANFORD, of Geneva, in the county of Kane and State of Illinois, have invented a new and useful Improvement in Railway-Car Axles, which is fully described in the following specification, reference being had to the accompanying drawings.

My invention relates to that class of railway-car axles whose wheels turn independently of each other, to prevent the wear to which they would otherwise be subjected in turning curves, where one wheel moves faster than the other.

My invention consists in the combination of an ordinary straight axle with a long sleeve, to which one of the wheels is attached, and which passes over the axle, and is secured to the inner side of the other wheel, fixed upon the axle, whereby the wheels are permitted to turn independently of each other, and the improvement is adapted to be applied to car-wheels and car-axles of ordinary construction.

Figure 1:
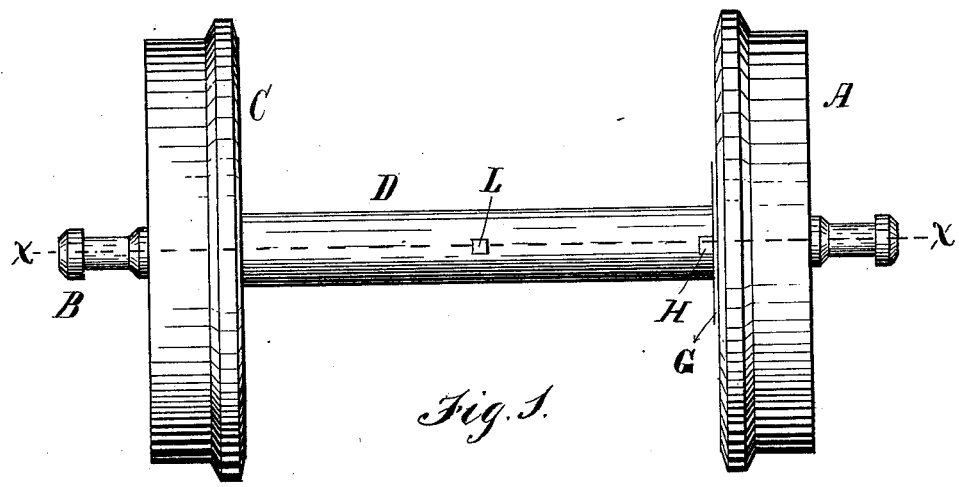
Figure 2:
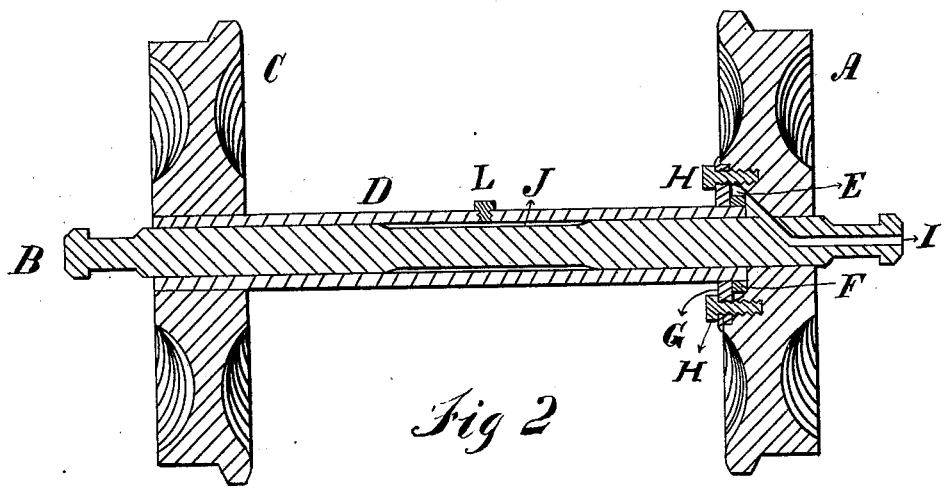

In the accompanying drawings, Figure 1 represents a plan view of my improved car-axle with its wheels; Fig. 2, a vertical sectional view taken at the line *x x*, Fig. 1.

A represents the car-wheel, that is firmly secured to the axle B, so as to revolve with it. C represents the other car-wheel, which is secured to the sleeve D, so as to revolve with it. The axle B fits closely within the sleeve D, and revolves within it. It passes through the wheel C, as clearly shown in the drawings. E is a recess in the hub of the wheel A, to receive the end of the sleeve D and its flange F. There is a collar, G, which fits closely to the sleeve D, and is firmly secured to the wheel A by the screws H. This collar G and flange F make a coupling, by which the end of the sleeve D is coupled to the wheel A in such a manner as to admit of either one turning freely and independently of the other.

This coupling secures the wheels C and A at a fixed distance apart, and while one wheel is secured rigidly to the axle B, and the other to the sleeve D, they turn independently of each other; but they always turn together when running on a straight track, and at all times, excepting when the condition of the track is such as to require one wheel to turn faster than the other.

I is an aperture through the end of the axle opening into the recess E, in which the coupling-joint is formed, for the purpose of lubricating the same from the outside of the car-wheel. J is a chamber at the middle of the axle, and L an opening through the sleeve for the admission of oil into the chamber J, from which it is gradually taken, to lubricate the entire remaining length of the axle, which constitutes a bearing in the sleeve D.

It will be seen that by my construction I have a whole axle extending from bearing to bearing, instead of dividing the axle, as is ordinarily done in this class of inventions.

The function of the sleeve is to hold the wheels at their proper relative distance from each other, while they are permitted to turn independently.

The coupling of the sleeve to the wheel A is simple, but strong and effective for the purpose designed.

The lubrication is effected in a simple and effective manner.

As my axle is of the same size throughout, having no projections or extraordinary attachments, my invention can be readily applied to ordinary car-axles already in use by simply removing one wheel and fixing it upon the sleeve, as described.

Having thus fully described my invention, what I claim, and desire to secure by Letters Patent, is—

A straight axle, B, of ordinary construction and without enlargements or projections thereon, in combination with the long sleeve D, the wheel A, fixed upon the axle B, and the wheel C, fixed upon the sleeve D, the free end of said sleeve being secured to the inner side of the wheel A, to couple the wheels together, substantially as and for the purpose set forth.

EBENEZER DANFORD.

Witnesses:
L. A. BUNTING,
W. C. CORLIES.